US012664282B2

(12) United States Patent
Chu et al.

(10) Patent No.: US 12,664,282 B2
(45) Date of Patent: Jun. 23, 2026

(54) CERTIFICATE UPDATE METHOD AND CERTIFICATE UPDATE SYSTEM OF DEVICE DRIVING THE SAME

(71) Applicant: Samsung Electronics Co., Ltd., Suwon-si (KR)

(72) Inventors: Younsung Chu, Suwon-si (KR); Jisoo Kim, Suwon-si (KR); Mungyu Bae, Suwon-si (KR); Sungho Yoon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 285 days.

(21) Appl. No.: 18/474,702

(22) Filed: Sep. 26, 2023

(65) Prior Publication Data

US 2024/0111853 A1      Apr. 4, 2024

(30) Foreign Application Priority Data

Oct. 4, 2022    (KR) ........................ 10-2022-0126586

(51) Int. Cl.
*G06F 21/57* (2013.01)
*G06F 21/33* (2013.01)
(Continued)

(52) U.S. Cl.
CPC ............ *G06F 21/572* (2013.01); *G06F 21/33* (2013.01); *G06F 21/44* (2013.01); *G06F 21/575* (2013.01);
(Continued)

(58) Field of Classification Search
CPC ...... G06F 21/33; G06F 21/575; G06F 21/602; G06F 21/64; G06F 21/44; G06F 21/572;
(Continued)

(56) References Cited

U.S. PATENT DOCUMENTS 7,913,086 B2    3/2011  Kostiainen et al.
11,323,275 B2    5/2022  Mondello et al.
(Continued)

FOREIGN PATENT DOCUMENTS

JP      2021-164009 A    10/2021
WO    2021/087221 A1    5/2021

OTHER PUBLICATIONS

Extended European Search Report for corresponding European Patent Application No. 23200058.8 issued on Feb. 6, 2024.
(Continued)

*Primary Examiner* — Shaqueal D Wade-Wright
(74) *Attorney, Agent, or Firm* — Harness, Dickey & Pierce, P.L.C.

(57) ABSTRACT

A method of updating a certificate for device identification of at least one example embodiment includes generating a device identifier comprising unique information of the device, generating a device identity (ID) certificate signing request (CSR) based on the device identifier, updating the bootloader, the updating including updating a certificate of the device based on the device ID CSR using firmware of the device in response to a request of a host device, and in response to the bootloader being changed, authenticating the updating of the bootloader based on a second certificate generated by an original equipment manufacturer (OEM) of the device in response to authentication of the bootloader failing based on a first certificate generated by a manufacturer of the device.

20 Claims, 18 Drawing Sheets

(51) Int. Cl.

| | | |
|---|---|---|
| *G06F 21/44* | (2013.01) | |
| *G06F 21/60* | (2013.01) | |
| *G06F 21/64* | (2013.01) | |
| *H04L 9/32* | (2006.01) | |

(52) U.S. Cl.
CPC ............ *G06F 21/602* (2013.01); *G06F 21/64* (2013.01); *H04L 9/3265* (2013.01); *H04L 9/3268* (2013.01); *H04L 9/3247* (2013.01)

(58) Field of Classification Search
CPC ... H04L 9/3265; H04L 9/3247; H04L 9/3268; H04L 9/3271
See application file for complete search history.

(56) References Cited

U.S. PATENT DOCUMENTS

| | | | | |
|---|---|---|---|---|
| 2013/0166907 A1* | 6/2013 | Brown | .................. | H04L 9/3268 |
| | | | | 713/156 |
| 2017/0195122 A1* | 7/2017 | Obaidi | .................. | H04L 9/0866 |
| 2020/0193065 A1* | 6/2020 | Smith | ..................... | G06F 21/73 |
| 2021/0103661 A1* | 4/2021 | Wu | ....................... | G06F 21/572 |
| 2021/0314365 A1 | 10/2021 | Smith et al. | | |
| 2022/0004627 A1 | 1/2022 | Smith et al. | | |
| 2022/0038272 A1 | 2/2022 | Hershman et al. | | |
| 2022/0141041 A1 | 5/2022 | Parikh et al. | | |
| 2022/0198018 A1* | 6/2022 | Wentz | .................. | H04L 9/3268 |
| 2025/0168017 A1* | 5/2025 | Huang | .................. | H04L 9/3263 |

OTHER PUBLICATIONS

Ronald Aigner et al: "Microsoft Confidential-Draft for Review 1 Device Identity with DICE and RIoT: Keys and Certificates (Draft for Review)," Sep. 1, 2017, pp. 1-15, XP055603767, retrieved from the internet: url:https://www.microsoft.com/en-us/research/wp-content/uploads/2017/09/KeysAndCertificatesForDiceAndRIoT-v3-2.docx [retrieved on Jul. 9, 2019].

England Paul et al: "RIot: A Foundation for Trust in the Internet of Things," Jan. 30, 2019, XP093123991, retrieved from the internet: URL:https://web.archive.org/web/20190130182011if_/https://www.microsoft.com/en-us/research/wp-content/uploads/2016/06/RIot20Paper-1.1-1.pdf [retrieved on Jan. 25, 2024].

* cited by examiner

CERTIFICATE UPDATE METHOD AND CERTIFICATE UPDATE SYSTEM OF DEVICE DRIVING THE SAME

CROSS-REFERENCE TO RELATED APPLICATION

This U.S. non-provisional application is based on and claims the benefit of priority under 35 U.S.C. § 119 to Korean Patent Application No. 10-2022-0126586, filed on Oct. 4, 2022, in the Korean Intellectual Property Office, the disclosure of which is incorporated by reference herein in its entirety.

BACKGROUND

Various example embodiments of the inventive concepts relate to a certificate update system, a certificate update apparatus, a certificate update non-transitory computer readable medium, a certificate update verification method, and/or a certificate update method, etc., and more particularly, to a method of verifying a certificate for identification of a device and/or updating a certificate chain when the device is changed, etc.

Generally, in a public key infrastructure (PKI), a digital signature is generated between devices using a private key, and the digital signature is verified using a public key corresponding to the private key. In the PKI, a certification authority issues a certificate to endorse the public key, and verify whether a public key issued by the certification authority is correct through chain verification of the certificate to verify the public key of a device.

When a manufacturing subject of a device is changed, the certification authority issues a new certificate. In this case, a secure protocol and data model (SPDM) is utilized.

SUMMARY

The device generating a security signal by the secure protocol and data model (SPDM) described above may include firmware, a device identify certificate engine, a bootloader, and when the bootloader is updated by the subject of usage of the device, an error may occur while the device is driven and/or operated.

Various example embodiments of the inventive concepts provide a certificate update method which enables a normal operation of a device even when a bootloader of the device is changed.

According to at least one example embodiment of the inventive concepts, there is provided a method of updating a certificate of a in response to a bootloader of the device being changed, the method including, generating a device identifier comprising unique information of the device, generating a device identity (ID) certificate signing request (CSR) based on the device identifier, updating the bootloader, the updating including updating a certificate of the device based on the device ID CSR using firmware of the device in response to a request of a host device, and in response to the bootloader being changed, authenticating the updating of the bootloader based on a second certificate generated by an original equipment manufacturer (OEM) of the device in response to authentication of the bootloader failing based on a first certificate generated by a manufacturer of the device.

According to at least one example embodiment of the inventive concepts, there is provided a method of updating a certificate of a device in response to a bootloader of the device being changed, the method including generating a device identifier, generating, by the bootloader, a device identity (ID) certificate signing request (CSR) based on the device identifier, and authenticating an update of the bootloader in response to the device ID CSR, the authenticating of the update of the bootloader further including, verifying a first certificate stored in a first slot of memory, requesting a second certificate a host device in response to the verifying of the first certificate failing, and storing the second certificate in a second slot of the memory and authenticating the update of the bootloader based on the second certificate.

According to at least one example embodiment of the inventive concepts, there is provided a certificate update system of a device for updating a certificate in response to a bootloader of the device being changed, the certificate update system including processing circuitry configured to generate a device identifier comprising unique information of the device, generate a device identity (ID) certificate signing request (CSR) based on the device identifier using a bootloader, update the bootloader based on the device ID CSR, update a certificate of the device in response to a request from a host device, and in response to the bootloader being changed, authenticate an update of the bootloader based on a second certificate generated by an original equipment manufacturer (OEM) of the device in response to authentication of the bootloader failing based on a first certificate generated by a manufacturer of the device.

BRIEF DESCRIPTION OF THE DRAWINGS

Various example embodiments will be more clearly understood from the following detailed description taken in conjunction with the accompanying drawings in which:

FIG. 4 is a block diagram of a first layer according to at least one example embodiment;

FIGS. 10A and 10B are diagrams illustrating updating of a certificate chain according to at least one example embodiment;

DETAILED DESCRIPTION

Various example embodiments of the inventive concepts will now be described more fully with reference to the accompanying drawings.

Figure 1:
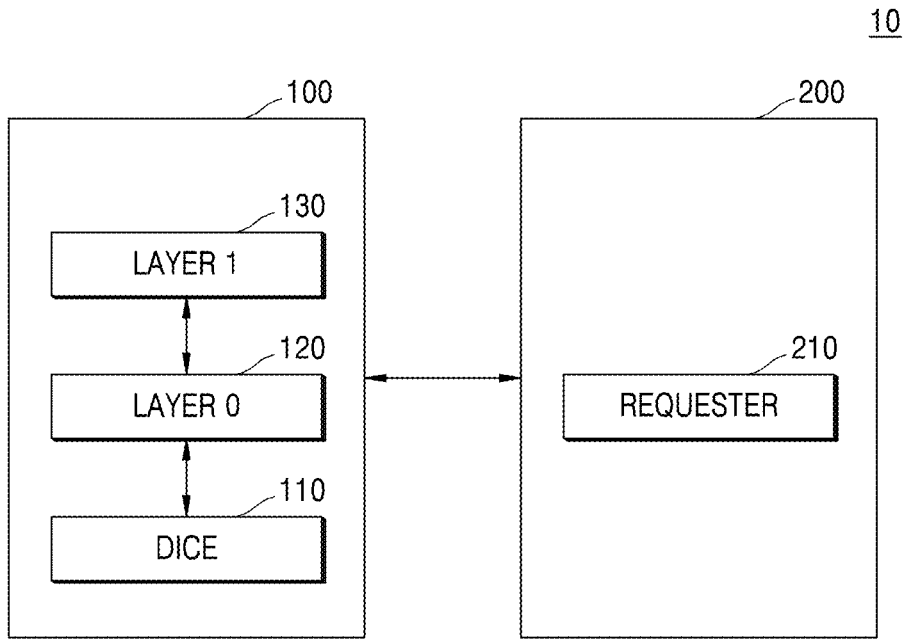
FIG. 1 is a block diagram of a device update certification system 10 according to at least one example embodiment.

FIG. 1 is a block diagram of a device update certification system 10 according to at least one example embodiment.

Referring to FIG. 1, the device update certification system 10 according to at least one example embodiment may include at least one device 100 and/or at least one host 200 (e.g., a host device, external device, etc.), but the example embodiments are not limited thereto, and for example, the system 10 may include a greater or lesser number of constituent components.

As shown in FIG. 1, the device update certification system 10 may process data as at least one electronic device. For example, the device 100 of the device update certification system 10 may be a memory device included in various electronic devices, such as a mobile device, a smartphone, a tablet, a personal digital assistant (PDA), a personal computer (PC), an Internet of Things (IoT) device, a laptop, a netbook, a home appliance, a vehicle, a smart device, etc. The device 100 according to at least one example embodiment may be a memory device such as a flash memory device, solid-state drive (SSD), low power double data rate4 (LPDDR4), LPDDR5, and/or LPDDR6, but is not limited thereto.

The device 100 may include processing circuitry which implements a device identify certificate engine (DICE) 110, a first layer 120, and/or a second layer 130, etc., but is not limited thereto, and for example, may include a lesser or greater number of layers, etc. The processing circuitry may include hardware including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The DICE 110 may generate a device unique identifier and may transmit the device unique identifier to the first layer 120, but is not limited thereto. Here, the device unique identifier may be used to generate a device certificate. Also, the device unique identifier may be a unique value generated once, and may, for example, be generated by using a one-time program (OTP), a random number generator, a pseudorandom number generator, etc., but is not limited thereto. The configuration of the DICE 110 is described in greater detail below in connection to FIGS. 2 and 3.

The first layer 120 may receive a device unique identifier from the DICE 110 and generate a device certificate and/or an alias certificate, but is not limited thereto. In addition, the first layer 120 may be a bootloader (e.g., a bootloader program, a bootloader firmware, etc.) used to boot the device 100, and may transmit a device ID certificate signing request to a device certification authority. The first layer 120 is described in greater detail below in connection to FIGS. 2 and 4.

The second layer 130 may store a device certificate and/or a device certificate chain, but is not limited thereto. For example, the second layer 130 may be firmware configured to include a certification authority (CA) that identifies the device 100. For example, the second layer 130 may be secure protocol and data model (SPDM) firmware, and may be a layer in which a responder (e.g., responder device, responder circuitry, etc.) and/or a certificate storage (e.g., certificate memory, certificate storage device, and/or certificate storage circuitry, etc.), which are described below, operate. The second layer 130 may receive an alias key, an alias certificate, a device ID certificate, and/or an endorsement ID certificate from the first layer 120, etc., and may determine whether the first layer 120 has been updated. The second layer 130 is described in greater detail below in connection to FIGS. 2 and 5.

The host 200 (e.g., host device, host circuitry, host sub-circuitry, etc.) may include processing circuitry which implements a requester 210 (e.g., requester device, requester sub-circuitry, etc.) and generate a plurality of commands for authenticating bootloader update of the device 100. For example, the requester 210 of the host 200 may connect to the responder of the second layer 120 to verify a certificate signing request of the device certificate, but is not limited thereto. A method, performed by the requester 210, of authenticating the bootloader update of the device 100 is described in greater detail below in connection to FIG. 11.

The host 200 may be implemented as an integrated circuit (IC) as a semiconductor chip, and accordingly, the host 200 may be referred to as a security chip, security IC, security processor, etc. The host 200 may include at least one processor and/or at least one encryption engine therein, and various functions, programs, and/or instructions performed therein may be implemented by embedded hardware or embedded software executed by at least one processor, processing circuitry, etc. Hardware and/or software implemented in the host 200 may perform at least one operation related to certificate generation and at least one operation related to encryption/decryption in a public key infrastructure (PKI).

The host 200 may further include a unit capable of protecting information therein from external attacks. For example, the host 200 may include a protection unit implemented as hardware or a combination of hardware and software, and may block access to information stored inside the host 200 from the outside (e.g., external devices, etc.) through the protection unit and/or change the information even when the information inside the host 200 is accessed from the outside (e.g., externally), thereby decreasing and/or preventing leakage of information and/or data (e.g., original information, confidential information, etc.) to the outside and/or external devices, etc.

One or more keys related to public key-based communication are installed and stored in the host 200, and various arithmetic operations using the stored keys may be performed. For example, the host 200 may store at least one private key (e.g., a certificate private key CA-SK, etc.) related to certificate generation. In addition, the host 200 may store at least one key pair (e.g., a device public key DEV-PK and a device private key DEV-SK, etc.) for performing public key-based communication. For example, in the host 200, a key pair may be installed and stored during a manufacturing process thereof, but the example embodiments are not limited thereto. In at least one example embodiment, as the host 200 includes software (not shown) for generating a key pair therein, the device public key DEV-PK and the device private key DEV-SK may also be generated when the host 200 is initially driven, but the example embodiments are not limited thereto.

According to at least one example embodiment, the device update certification system 10 may safely and/or securely issue a security certificate without exposing information and/or data (e.g., important information, confidential information, etc.), such as the certificate private key CA-SK and/or a device private key, and may also perform a safe secure protocol. That is, in an operation of issuing a certificate and/or performing communication according to a secure protocol, the possibility of exposure of private keys may be reduced compared to a case where a certificate private key and/or a device private key is encrypted and used in a software manner. Moreover, one or more example embodiments of the inventive concepts allow intermediary manufacturers, assemblers, software developers, and/or trusted customers of the manufacturer, etc., (e.g., trusted entities, etc.) to securely update, modify, and/or change the security certificates and/or certificates chains associated with the device 100 in response to updating, modifying, and/or changing software and/or hardware associated with the device 100, etc.

Figure 2:
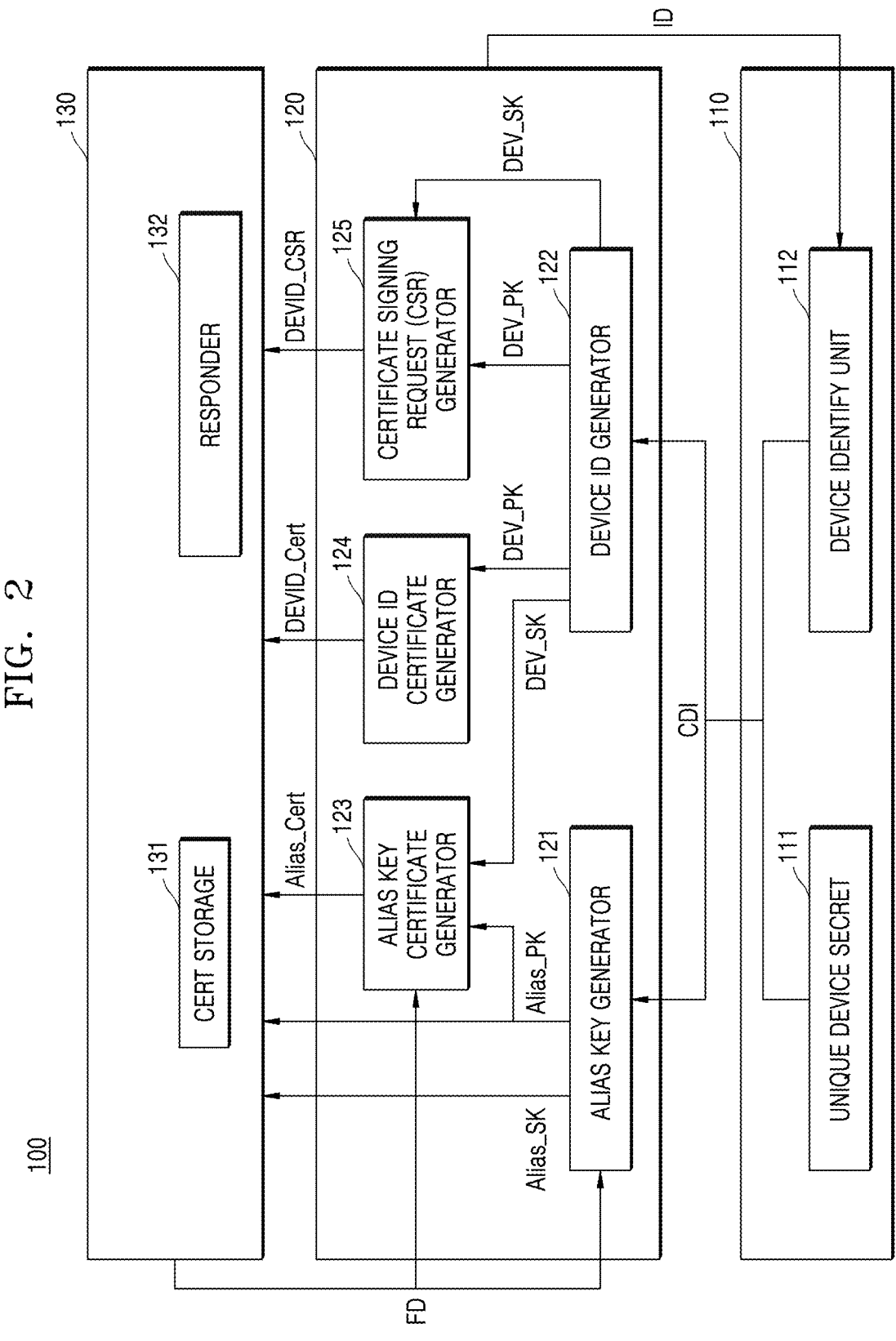
FIG. 2 is a block diagram of a device according to at least one example embodiment.
Figure 3:
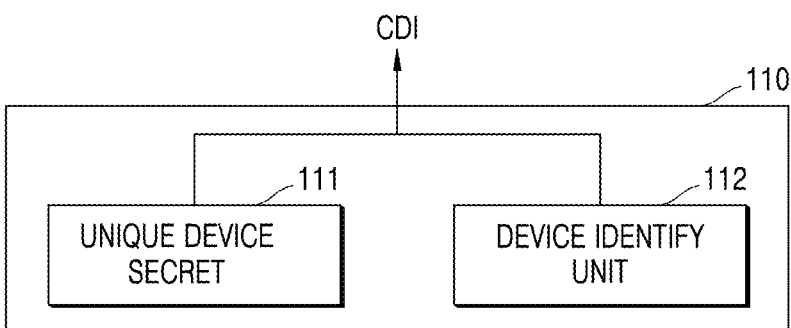
FIG. 3 is a block diagram of a device identify certificate engine (DICE) according to at least one example embodiment.
Figure 4:
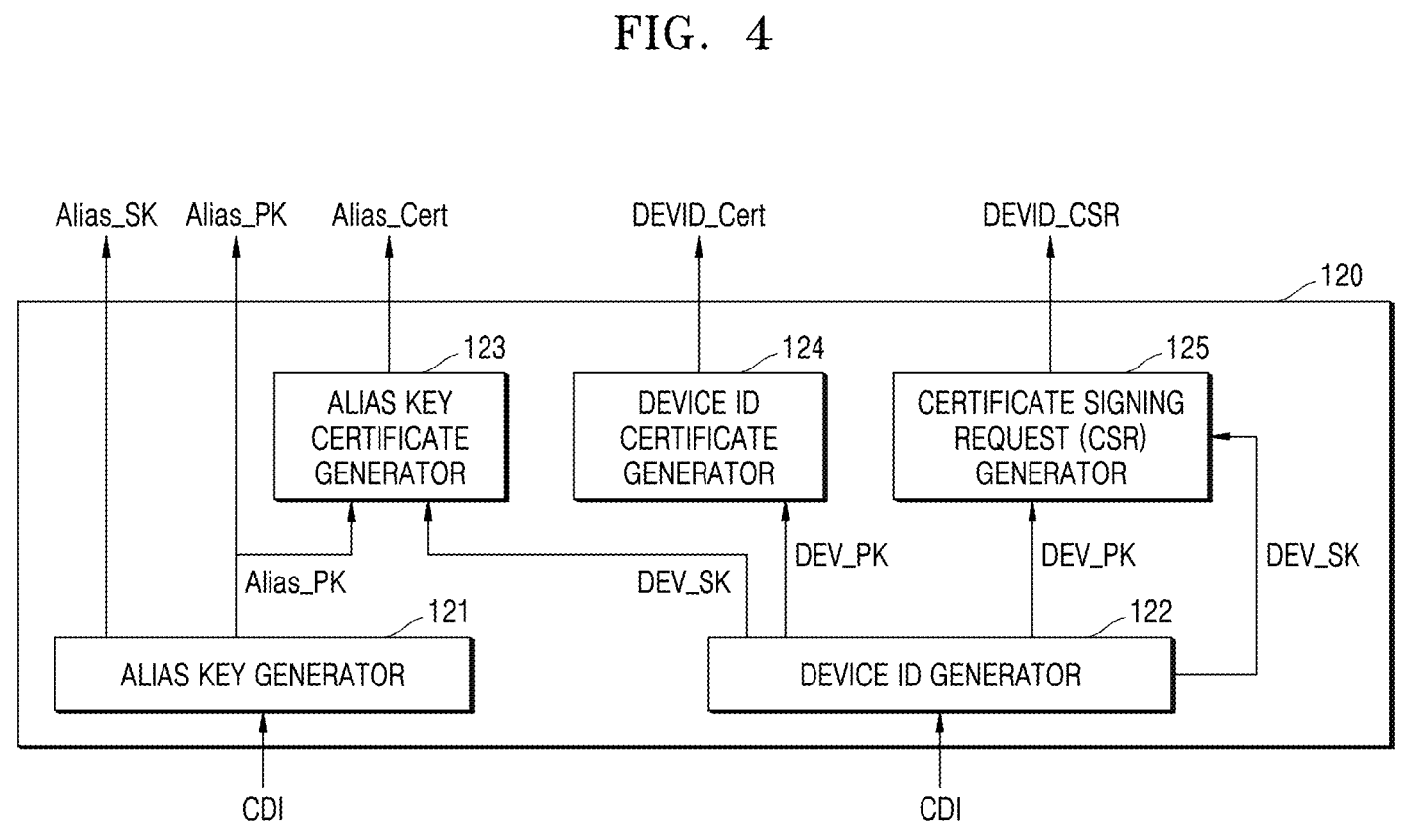
Figure 5:
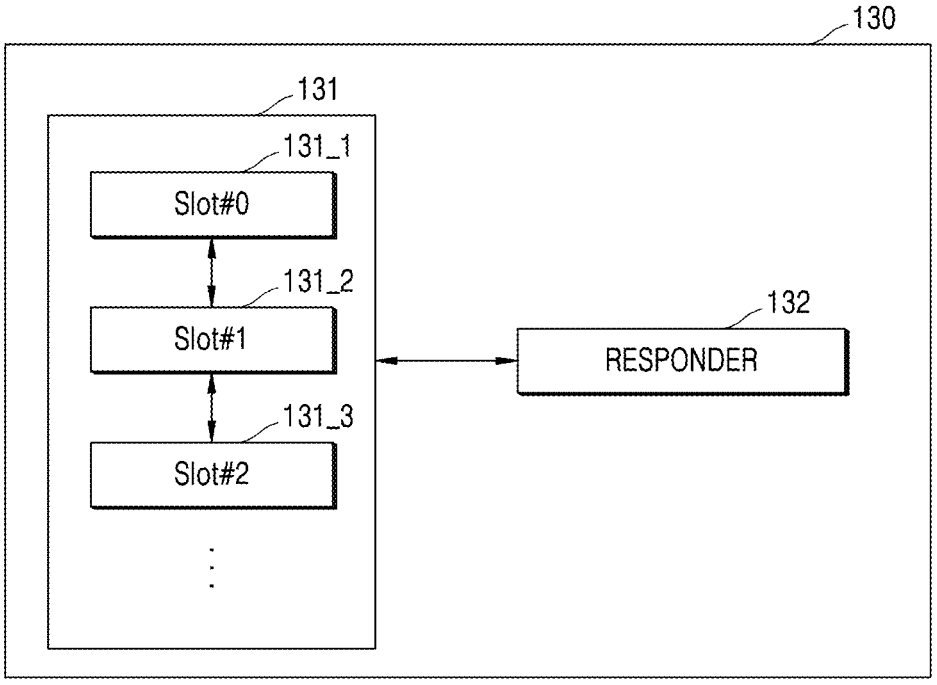
FIG. 5 is a block diagram of a second layer according to at least one example embodiment.

FIG. 2 is a block diagram of the device 100 according to at least one example embodiment. FIG. 3 is a block diagram of the DICE 110 according to at least one example embodiment. FIG. 4 is a block diagram of the first layer 120 according to at least one example embodiment. FIG. 5 is a block diagram of the second layer 130 according to at least one example embodiment.

Referring to FIGS. 2 and 3, the device 100 may include the DICE 110, the first layer 120, and/or the second layer 130, but the example embodiments are not limited thereto.

The DICE 110 may include a unique device secret memory 111 and/or a device identify unit 112, etc., but is not limited thereto.

In the unique device secret 111, device unique information may be stored and/or previously stored, for example, during manufacturing of the device 100, but the example embodiments are not limited thereto. For example, the unique device secret 111 may include a NOR flash memory and/or a NAND flash memory, and may be stored in an arbitrary area of an OTP area, but is not limited thereto. In addition, the unique device secret 111 may exist in the form of hardware, and the stored device unique information may be accessed through, for example, a cyber resilient embedded systems (Cyres) latch, but the example embodiments are not limited thereto.

The device identify unit 112 may receive identification (ID) information from the first layer 120 and determine whether the first layer 120 is changed. In addition, the device identify unit 112 and/or the unique device secret 111 may utilize their respective information and generate a device compound device identifier (CDI), etc. The device CDI may be a one-time identifier due to the OTP characteristic of the unique device secret 111 and/or may be an encrypted identifier. Also, the device CDI may be subordinate to the first layer 120. That is, when the first layer 120 is not changed, the device CDI may be synchronized with the first layer 120 so that the unique information of the device 100 may not be changed.

Referring to FIGS. 2 and 4, the first layer 120 includes an alias key generator 121, a device ID generator 122, an alias key certificate generator 123, a device ID certificate generator 124, and/or a certificate signing request (CSR) generator 125, but the example embodiments are not limited thereto.

The alias key generator 121 receives the device CDI from the DICE 110 and firmware information FD from the second layer 130 (e.g., CA information and/or SPDM information, etc.) and generates an alias key based on the device CDI and the firmware information FD, but is not limited thereto. The alias key may be generated as an asymmetric pair of an alias private key Alias_SK and a corresponding alias public key Alias_PK. Here, the alias key pair Alias_SK and Alias_PK may be temporary keys for authenticating device information, and are transmitted to the second layer 130. Also, the alias public key Alias_PK may be transmitted to the alias key certificate generator 123, but is not limited thereto.

The device ID generator 122 receives the device CDI and generates a device private key DEV_SK and a device public key DEV_PK based on the device CDI. Here, the device private key DEV_SK and the device public key DEV_PK may be generated as an asymmetric pair, and the device private key DEV_SK and the device public key DEV_PK may configure a device ID, but the example embodiments are not limited thereto. In addition, the device private key DEV_SK may be transmitted to the alias key certificate generator 123 and the CSR generator 125, and the device public key DEV_PK may be transmitted to the device ID certificate generator 124 and the CSR generator 125, but are not limited thereto. Here, the device ID may be a hash value of a measurement value of the first layer 120, but is not limited thereto, and for example, may be any unique identifier associated with the first layer 120, generated by the first layer 120, set by the first layer 120, etc. For example, the hash value and/or the measurement value according to at least one example embodiment may be a unique ID of the device 100, etc.

The alias key certificate generator 123 receives the firmware information FD from the second layer 130, the alias public key Alias_PK, and the device private key DEV_SK, and generates an alias certificate Alias_Cert based on the firmware information FD, the alias public key Alias_PK, and/or the device private key DEV_SK. The alias certificate Alias_Cert is obtained by encrypting a device ID and may be used to check whether the first layer 120 is updated.

In addition, the device ID certificate generator 124 receives the device public key DEV_PK and generates a device ID certificate DEVID_Cert. The device ID certificate DEVID_Cert may form a chain with a manufacturer certificate (e.g., may be appended to the manufacturer certificate to form a certificate chain, etc.) stored in a certificate storage 131 of the second layer 130, and may be used to confirm whether the first layer 120 has been updated, changed, and/or modified, etc.

The CSR generator 125 may receive the device public key DEV_PK and the device private key DEV_SK, and generate a device ID certificate signing request DEVID_CSR based on the device public key DEV_PK and/or the device private key DEV_SK. That is, the device ID certificate signing request DEVID_CSR is generated based on the device public key DEV_PK and the device private key DEV_SK key pair generated based on the device CDI, and is provided to the second layer 130. Meanwhile, when the first layer 120 is changed, modified, updated, etc., the device CDI is changed (and/or modified, updated, etc.), and thus, the device ID certificate signing request DEVID_CSR is also changed (and/or modified, updated, etc.). Accordingly, when the first layer 120 is changed, modified, updated, etc., the device ID certificate signing request DEVID_CSR is also changed, modified, updated, etc. As described below, the second layer 130 may determine whether the first layer 120 is changed (and/or modified, updated, etc.) based on whether the device ID certificate signing request DEVID_CSR is changed (and/or modified, updated, etc.), and update information of the first layer 120.

Referring to FIGS. 2 and 5, the second layer 130 may include a certificate storage 131, and/or the responder 132, etc., but is not limited thereto. The certificate storage 131 may include a plurality of slots 132_1, 132_2, and 132_3, . . ., but is not limited thereto.

The certificate storage 131 may store certificates in the plurality of slots (e.g., memory slots, slots in memory, etc.) 132_1, 132_2, and 132_3, . . . , and provide the certificate of the device 100 in response to a request of the responder 132. Hereinafter, the plurality of slots are referred to as a first slot 131_1, a second slot 131_2, and a third slot 131_3, etc. However, the number of slots included in the certificate storage 131 is not limited thereto, and may further include a greater or lesser number of slots.

According to at least one example embodiment, the first slot 131_1 may include certificate information input, for example, during a time period when a manufacturer manufactures the device 100, but the example embodiments are not limited thereto. In addition, the second slot 131_2 may include certificate information input by at least one original equipment manufacturer (OEM), etc. In addition, the third slot 131_3 may include certificate information input by at least one customer (e.g., customer of the device 100, user of the device 100, etc.), but is not limited thereto. However, the information stored in the first to third slots 131_1, 131_2, and 131_3 is not limited thereto, and for example, according to at least one example embodiment, the certificate information input by the manufacturer may be stored in the first and second slots 131_1 and 131_2, and the certificate information input by the OEM or the customer may be stored in the third slot 131_3, etc.

When the first layer 120 is changed (and/or modified, updated, etc.), the responder 132 may perform an operation of verifying the requester 210 of the host 200 and the first layer 120, and update the first layer 120 based on a verification result. For example, when the first layer 120 is changed, and the responder 132 fails to authenticate the first layer 120 based on a first certificate generated by the manufacturer of the device 100 (e.g., the changed first layer 120 fails an authentication check based on the first certificate previously generated by the manufacturer of the device 100, etc.), the responder 132 may authenticate an update of the first layer 120 based on a second certificate generated by the OEM, but is not limited thereto. The first certificate according to at least one example embodiment may be a certificate generated by a manufacturer and stored in the device 100, but is not limited thereto. The second certificate according to at least one example embodiment may be an alias key-based certificate manufactured by the OEM, but is not limited thereto.

The responder 132 may communicate with the requester 210 of the host 200 and generate a plurality of request signals to the certificate storage 131. For example, when the first layer 120 is changed, the responder 132 may generate a certificate request signal, a device certificate signing request signal, and/or a certificate setting signal, etc. That is, when the first layer 120 is changed inside the device 100, the responder 132 may request information necessary for updating the device certificate from the host 200, but is not limited thereto.

Figure 6:
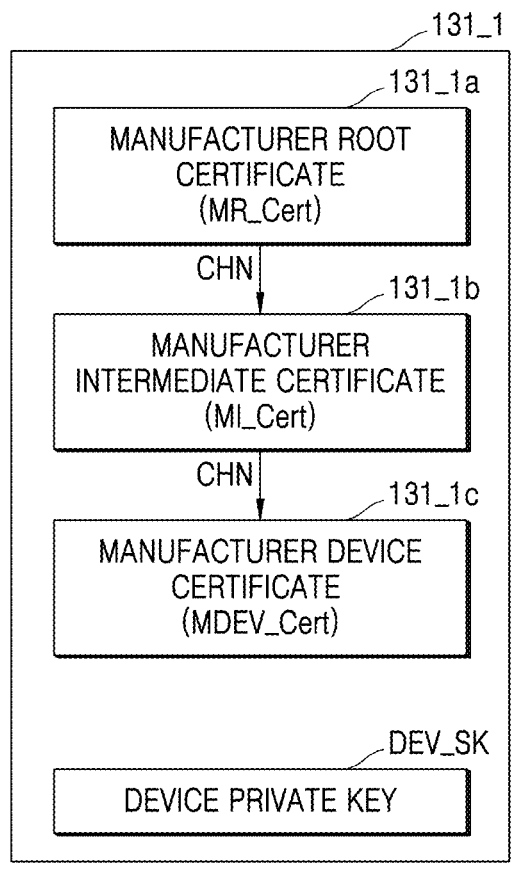
FIG. 6 is a diagram illustrating information stored in a first slot according to at least one example embodiment.

FIG. 6 is a diagram illustrating information stored in a first slot according to at least one example embodiment.

Referring to FIG. 6, according to at least one example embodiment, device unique certificate information input during a time period when a manufacturer manufactures the device 100 is stored in the first slot 131_1, but is not limited thereto. For example, the first slot 131_1 may store a manufacturer root certificate MR_Cert 131_1a, a manufacturer intermediate certificate MI_Cert 131_1b, and/or a manufacturer device certificate MDEV_Cert 131_1c, etc., and the manufacturer root certificate MR_Cert 131_1a, the manufacturer intermediate certificate MI_Cert 131_1b, and/or the manufacturer device certificate MDEV_Cert 131_1c, etc., may form a chain (e.g., certificate chain, etc.) CHN so that the device private key DEV_SK may be stored in the first slot 131_1. Here, the manufacturer device certificate MDEV_Cert 131_1c stored in the first slot 131_1 may be referred to as a first certificate.

That is, a certificate update method of the device 100 according to at least one example embodiment may be performed by forming a chain (e.g., certificate chain, etc.) including a root certificate, an intermediate certificate, and/or a device certificate in the manufacturing operation of the device 100, but the example embodiments are not limited thereto. As described below, when the device 100 of the first layer 120 is changed, because the device certificate is also changed, the device certificate chain is updated. Hereinafter, the second slot 131_2 storing certificate information input by an OEM and the third slot 131_3 storing certificate information input by at least one customer are described.

Figure 7:
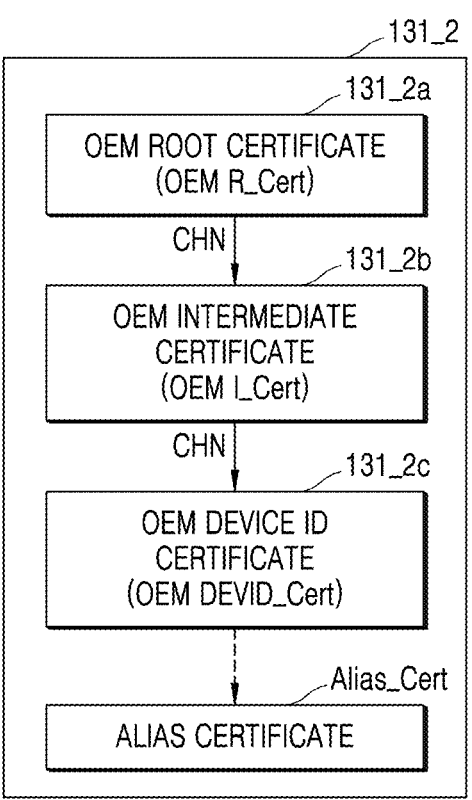
FIG. 7 is a diagram illustrating information stored in a second slot according to at least one example embodiment.
Figure 8:
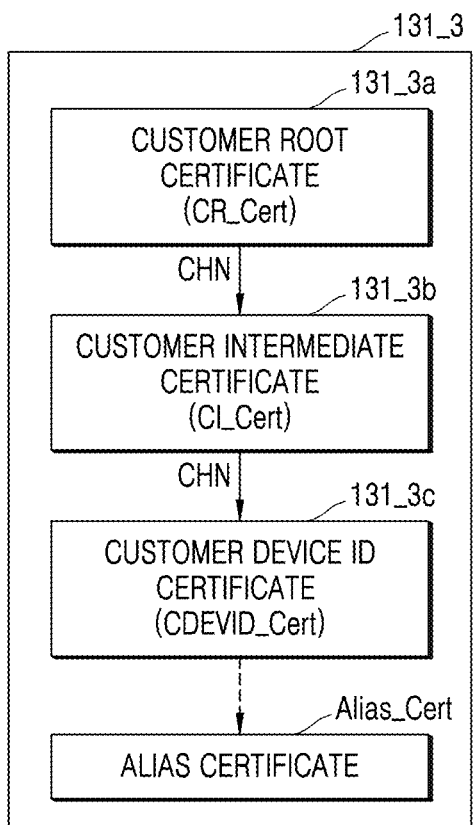
FIG. 8 is a diagram illustrating information stored in a third slot according to at least one example embodiment.

FIG. 7 is a diagram illustrating information stored in a second slot according to at least one example embodiment. FIG. 8 is a diagram illustrating information stored in a third slot according to at least one example embodiment.

Referring to FIGS. 7 and 8, certificates input by an OEM and/or at least one customer, etc., are also stored by forming the chain CHN connected to and/or including a root certificate, an intermediate certificate, and/or a device certificate, or in other words, the certificate chain CHN is further changed, updated, and/or modified to include and/or append the certificates received from the OEM and/or the at least one customer, etc. Also, the second slot 131_2 and the third slot 131_3 may additionally store the alias certificate Alias_Cert, but are not limited thereto. That is, even when the certificate is updated, the device 100 may store and/or simultaneously store a manufacturer certificate and/or the alias certificate Alias_Cert, etc.

For example, when the certificate of the device 100 is updated according to and/or based on the certificate information input by the OEM, the second slot 131_2 stores an OEM root certificate OEM R-Cert 131_2a, an OEM intermediate certificate OEM I_Cert 131_2b, and/or an OEM device ID certificate OEM DEVID_Cert 131_2c connected through, appended to, and/or included in the chain CHN. In addition, the OEM root certificate OEM R-Cert 131_2a, the OEM intermediate certificate OEM I_Cert 131_2b, and/or the updated OEM device ID certificate OEM DEVID_Cert 131_2c may be connected through, appended to, and/or included in the chain CHN, and the second slot 131_2 may additionally generate the alias certificate Alias_Cert.

When the certificate of the device 100 is updated, modified, and/or changed according to the certificate information input by the customer, the third slot 131_3 stores a customer root certificate CR_Cert 131_3a, a customer intermediate certificate CI_Cert 131_3b, and/or a customer device ID certificate CDEVID_Cert 131_3c connected through, appended to, and/or included in the chain CHN, etc. In addition, the customer root certificate CR_Cert 131_3a, the customer intermediate certificate CI_Cert 131_3b, and/or the customer device ID certificate CDEVID_Cert 131_3c are connected through, appended to, and/or included in the chain CHN, and the third slot 131_3 may additionally generate the alias certificate Alias_Cert. That is, even when the certificate is updated, the device 100 may store and/or simultaneously store the manufacturer certificate and the alias certificate Alias_Cert.

In addition, the OEM device ID certificate OEM DEVI-D_Cert 131_2c and/or the customer device ID certificate CDEVID_Cert 131_3c stored in the second slot 131_2 and/or the third slot 131_3 may be referred to as a second certificate, etc.

Figure 9A:
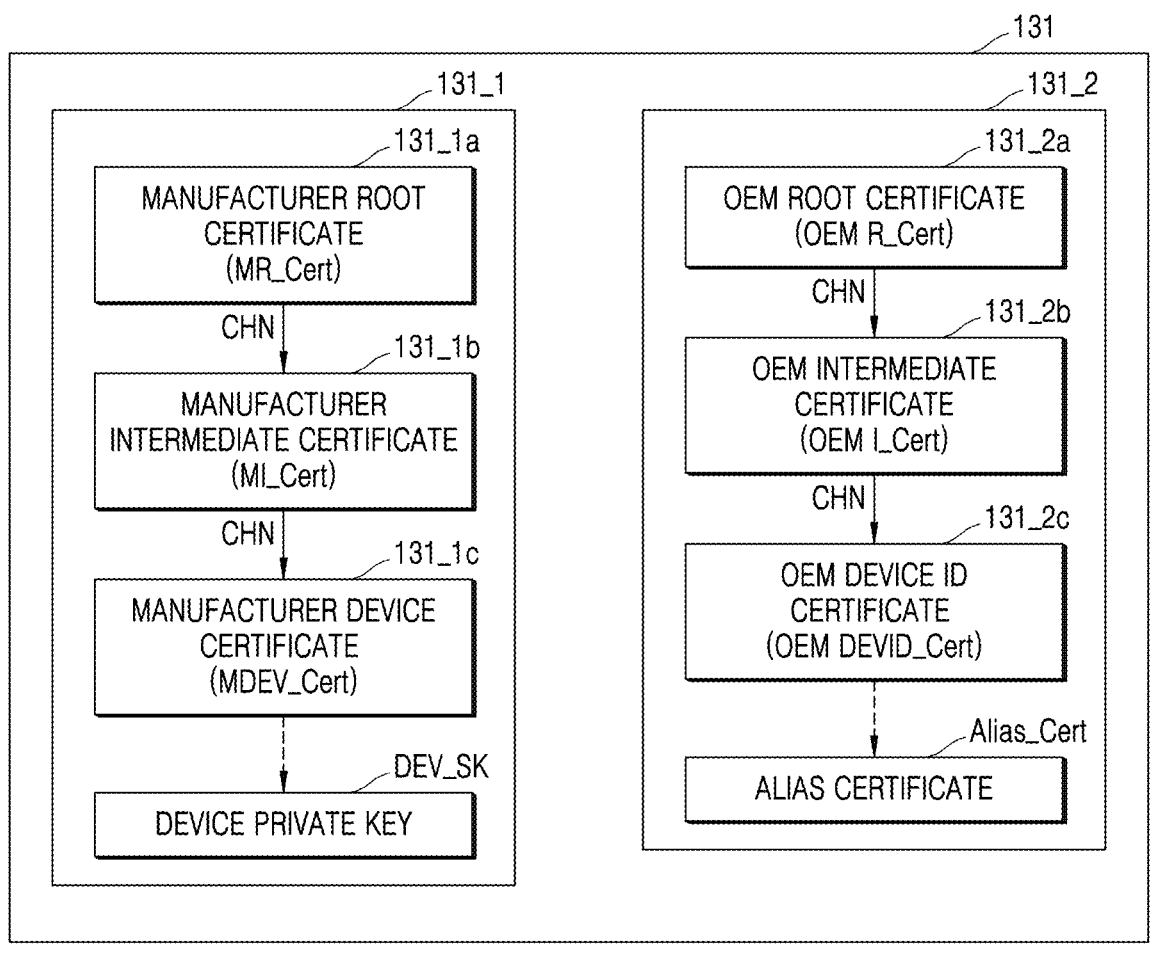
FIGS. 9A and 9B are diagrams illustrating updating of a certificate chain according to at least one example embodiment.
Figure 9B:
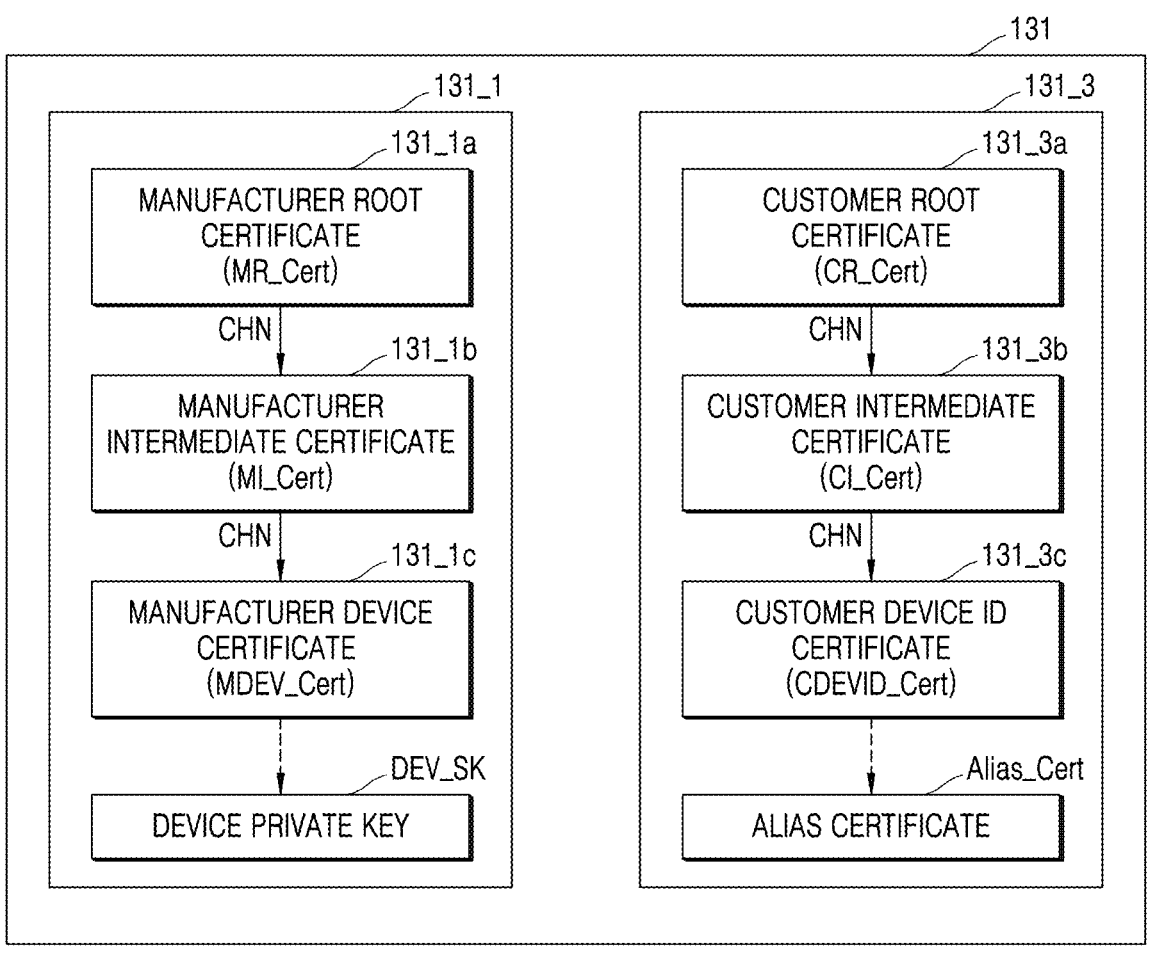

FIGS. 9A and 9B are diagrams illustrating updating of a certificate chain according to at least one example embodiment.

Referring to FIG. 9A, when the first layer 120 is changed to a layer of an OEM (e.g., OEM bootloader, a bootloader generated by/updated by/modified by/changed by an OEM, etc.), a device certificate DEV_Cert generated by the first layer 120 is also changed, and thus, a device certificate is updated to normally drive (e.g., properly and/or successfully operate) the device 100. Here, in at least one example embodiment, the OEM device ID certificate OEM DEVI-D_Cert 131_2c and/or the alias certificate Alias_Cert may be utilized. For example, when the first layer 120 is changed by the OEM, the device 100 causes an error to occur when using the stored and/or previously stored manufacturer root certificate MR_Cert 131_1a, the manufacturer intermediate certificate MI_Cert 131_1b, and/or the manufacturer device certificate MDEV_Cert 131_1c, etc. Accordingly, when the first layer 120 is changed, the responder 132 may detect that the first layer 120 has been changed, and may request the device certificate DEV_Cert from the certificate storage 131. Here, the certificate storage 131 provides the OEM device ID certificate OEM DEVID_Cert 131_2c and/or the alias certificate Alias_Cert, and thus, the responder 132 may update a manufacturer certificate chain, and successfully authenticate the update of the first layer 120 of the device 100.

That is, when the first layer 120 of the device 100 according to at least one example embodiment is updated, the responder 132 may determine whether the first layer 120 is changed based on a first certificate stored in the first slot 131_1, and when it is determined that the first layer 120 has been changed, may receive changed authentication information and update information of a second certificate including a changed certificate chain to the second slot 131_2. Here, the first certificate may be the manufacturer device certificate MDEV_Cert 131_1c, and the second certificate may be defined as the OEM device ID certificate OEM DEVID_Cert 131_2c or a customer device ID certificate CDEVID_Cert 131_3c. That is, when a bootloader of the device 100 is changed, the certificate storage 131 according to at least one example embodiment may store the manufacturer certificate in the first slot 131_1 and the OEM certificate in the second slot 131_2, thereby efficiently performing a device certificate update procedure.

FIG. 9B illustrates a case where the first layer 120 is changed by a customer. Referring to FIG. 9B, when the first layer 120 is changed to a layer manufactured by the customer, the device certificate DEV_Cert generated by the first layer 120 is also changed, and thus, a device certificate needs to be updated to normally drive the device 100. Here, in at least one example embodiment, any one of the customer device ID certificate CDEVID_Cert 131_3c of the customer and/or the alias certificate Alias_Cert may be utilized. For example, when the first layer 120 is changed by the customer, the device 100 causes an error to occur when using the original, previous, stored, and/or previously stored manufacturer root certificate MR_Cert 131_1a, the manufacturer intermediate certificate MI_Cert 131_1b, and/or the manufacturer device certificate MDEV_Cert 131_1c. Accordingly, when the first layer 120 is changed, the responder 132 may detect that and/or infer that the first layer 120 has been changed, and the requester 210 may request verification of a certificate from the responder 132. For example, the responder 132 may receive a certificate verification signal from the requester 210 and request the device certificate DEV_Cert from the certificate storage 131, etc. Here, the certificate storage 131 may update a manufacturer certificate chain by providing the customer device ID certificate CDEVID_Cert 131_3c and/or the alias certificate Alias_Cert to the responder 132, and successfully authenticate the update of the first layer 120 of the device 100. That is, when a bootloader of the device 100 is changed, the certificate storage 131 according to at least one example embodiment may store the manufacturer certificate in the first slot 131_1 and the customer certificate in the third slot 131_3, thereby efficiently performing a device certificate update procedure.

Figure 10A:
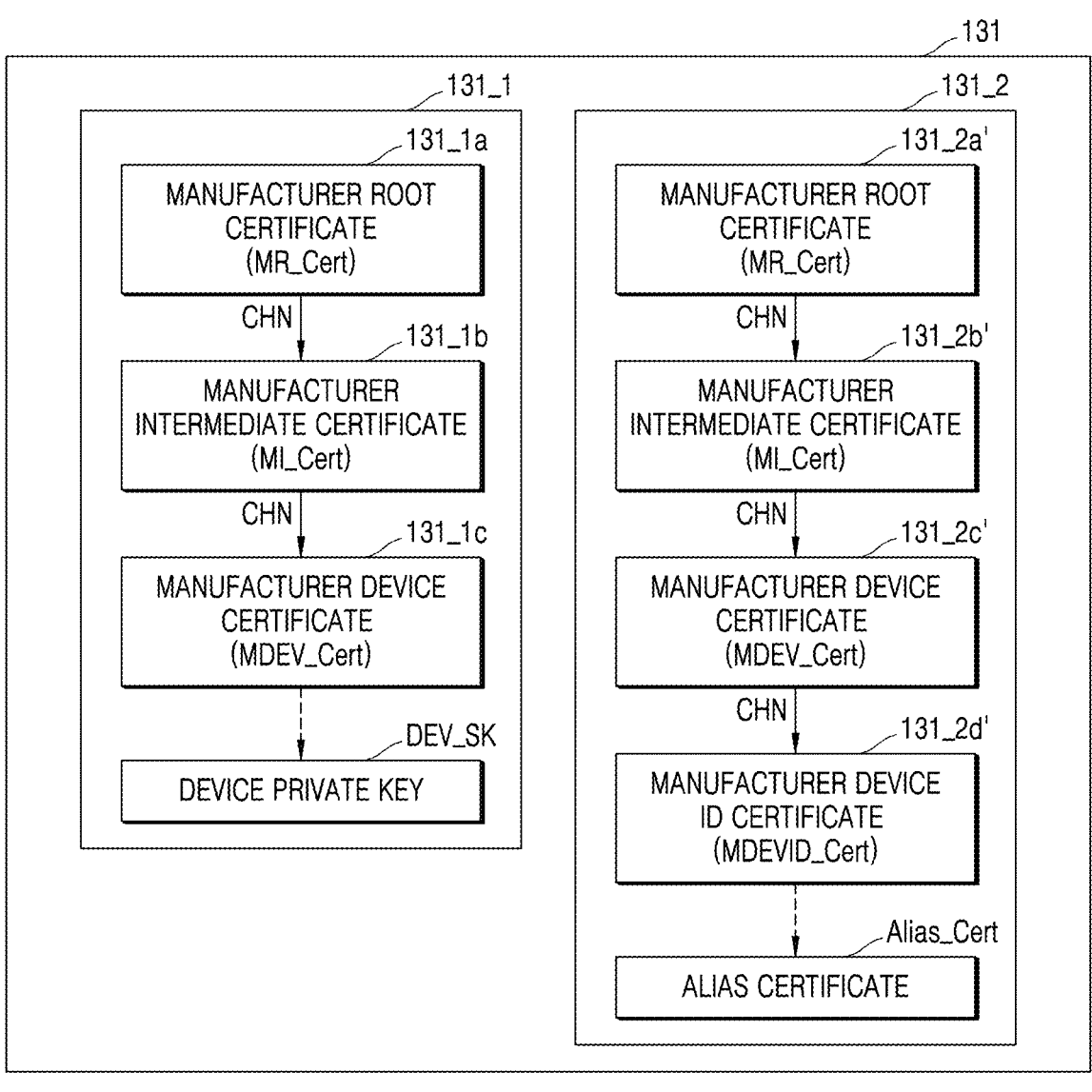
Figure 10B:
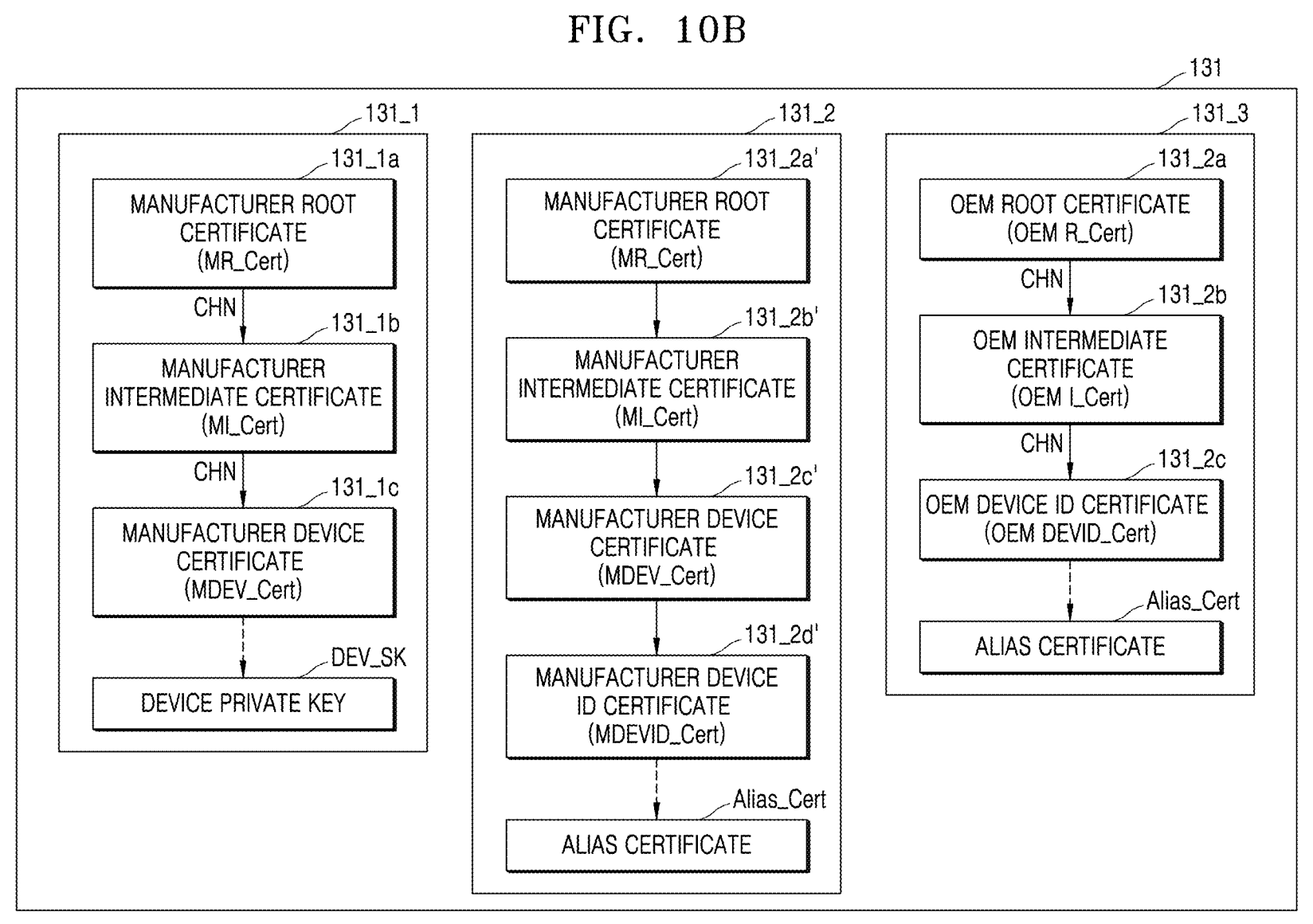

FIGS. 10A and 10B are diagrams illustrating updating of a certificate chain according to at least one example embodiment. Specifically, FIGS. 10A and 10B illustrate a method of updating the certificate chain by using a method different from at least one example embodiment described with reference to FIGS. 9A and 9B.

Referring to FIG. 10A, both the first slot 131_1 and the second slot 131_2 according to at least one example embodiment may store certificates that are input by manufacturers. For example, the manufacturer root certificate MR_Cert 131_1a, the manufacturer intermediate certificate MI_Cert 131_1b, and/or the manufacturer device certificate MDEV_Cert 131_1c may be connected to each other in the and/or through the chain CHN in the first slot 131_1, and the device private key DEV_SK generated based on the manufacturer root certificate MR_Cert 131_1a, the manufacturer intermediate certificate MI_Cert 131_1b, and/or the manufacturer device certificate MDEV_Cert 131_1c may be stored in the first slot 131_1, but is not limited thereto. In addition, a manufacturer root certificate MR_Cert 131_2a', a manufacturer intermediate certificate MI_Cert 131_2b', a manufacturer device certificate MDEV_Cert 131_2c', and/or a manufacturer device ID certificate MDEVID_Cert 131_2d' may be connected to each other through (e.g., included in the certificate chain, appended to the certificate chain, etc.) the certificate chain CHN in the second slot 131_2, but is not limited thereto. In addition, the alias certificate Alias_Cert may be stored in the second slot 131_2, etc. As described above, the manufacturer device certificate MDEV_Cert 131_1c may be stored in the first slot 131_1 according to at least one example embodiment, and manufacturer device ID certificate MDEVID_Cert 131_2d' and the alias certificate Alias_Cert may be stored in the second slot 131_2, but is not limited thereto. A variety of types of certificates including manufacturer device information are stored in the first slot 131_1 and/or the second slot 131_2, as described below, and thus, when OEM certificates are provided in various formats, the device 100 may use a chain of stored certificates regardless of format, etc.

Referring to FIG. 10B, the third slot 131_3 may store an OEM root certificate OEM R-Cert 131_2a, an OEM intermediate certificate OEM I_Cert 131_2b, and/or an OEM device ID certificate OEM DEVID_Cert 131_2c, and may store the alias certificate Alias_Cert having information of the OEM device ID certificate OEM DECID_Cert 131_2c. Here, as described below, the requester 210 may update the certificate chain by providing the OEM device ID certificate OEM DECID_Cert 131_2c and/or the alias certificate Alias_Cert in response to a signing request of the responder 132.

Figure 11:
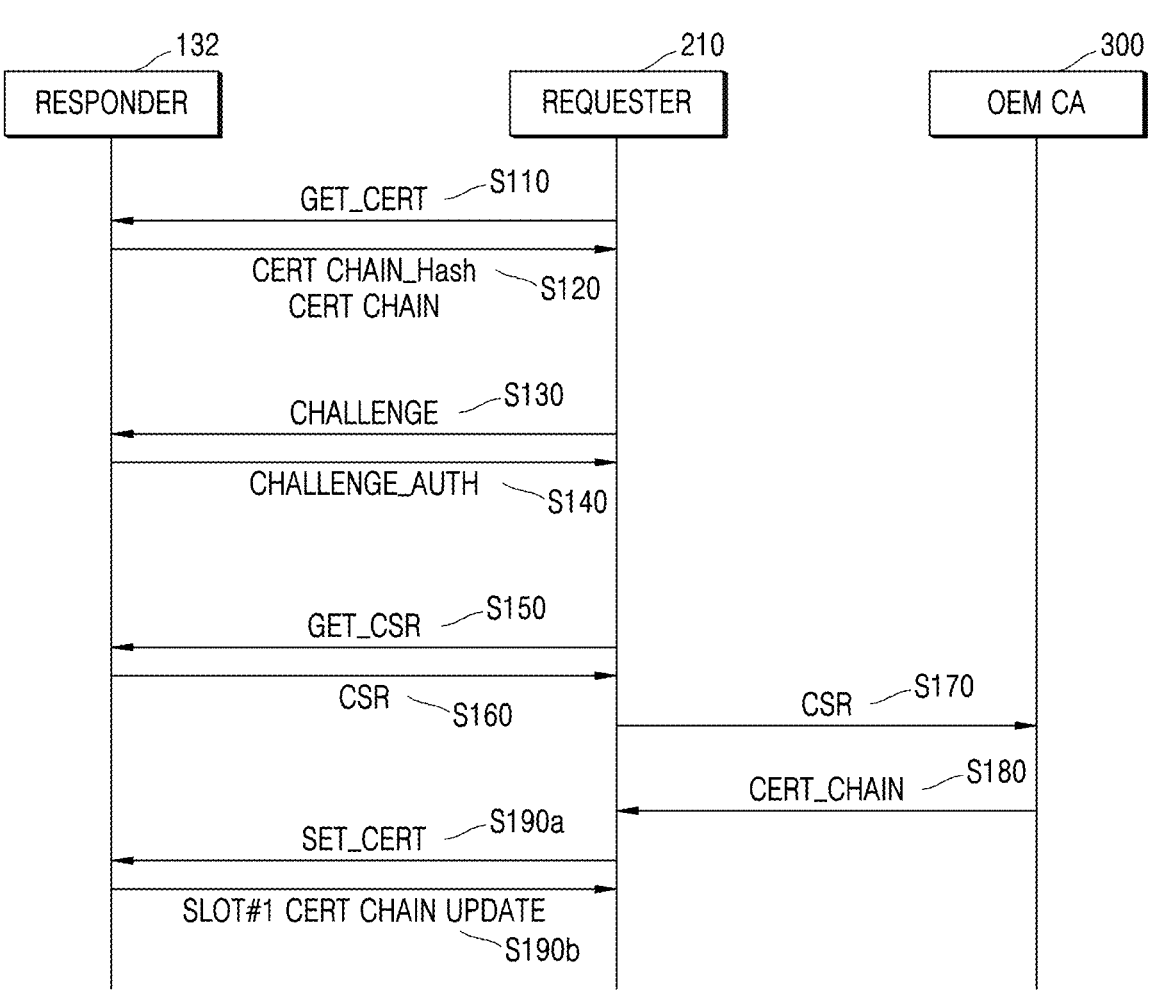
FIG. 11 is a flowchart illustrating a certificate update verification method and a certificate update method according to at least one example embodiment.

FIG. 11 is a flowchart illustrating a certificate update verification method and a certificate update method according to at least one example embodiment.

Referring to FIG. 11, when the first layer 120 is changed (e.g., modified, updated, etc.), the device 100 may not operate normally, successfully, as expected, etc. Accordingly, the requester 210 transmits a certificate request signal GET_CERT to the responder 132 in operation S110.

When the certificate request signal GET_CERT is received, the responder 132 provides existing certificate chain hash data CERT CHAIN_Hash and/or certificate chain data CERT_CHAIN of the device 100 to the requester 210 in operation S120.

When the certificate chain hash data CERT CHAIN_Hash and the certificate chain data CERT_CHAIN are received, the requester 210 detects that the first layer 120 has been changed, and requests a challenge message CHALLENGE from the responder 132 to update a certificate chain in operation S130. Here, the challenge message CHALLENGE may refer to a part and/or portion of a certificate chain verification operation for updating a certificate chain, but the example embodiments are not limited thereto.

When a challenge signal is received, the responder 132 performs a challenge authentication CHALLENGE_AUTH in operation S140. The challenge authentication CHALLENGE_AUTH may include providing changed information of the first layer 120. A message of the challenge authentication CHALLENGE_AUTH may be generated based on the device private key DEV_SK.

When the challenge authentication CHALLENGE_AUTH is completed, the requester 210 transmits a certificate signing request provision signal GET_CSR to the responder 132 in operation S150, and the responder 132 provides a CSR of the device 100 to the requester 210 in operation S160. Here, the CSR may be newly generated when the first layer 120 is changed (e.g., modified, updated, etc.). In addition, the CSR may include a public key and/or a unique serial number of the device 100, and may be signed by a private key of the device 100, but is not limited thereto. Also, the CSR may be information issued and/or stored by a manufacturer of the device 100, but the example embodiments are not limited thereto.

When the CSR is received, the requester 210 transmits the received CSR to an OEM CA 300 in operation S170. Also, when the CSR is received, the OEM CA 300 transmits the certificate chain CERT_CHAIN to the requester 210 in operation S180. Here, the certificate chain CERT_CHAIN may be a chain of certificates generated by, for example, the intermediate producer, an OEM, an assembler, a software company, an entity separate from the manufacturer, etc., and may be different from a device certificate generated by a manufacturer of the device 100, etc. That is, the requester 210 may transmit the CSR to the OEM CA 300 and receive a new certificate chain, thereby updating a certificate.

When the certificate chain CERT_CHAIN is received from the OEM CA 300, the requester 210 transmits a new certificate setting signal SET_CERT to the responder 132 in operation S190a. A second certificate may be included in the new certificate setting signal SET_CERT according to at least one example embodiment. When the new certificate setting signal SET_CERT is received, the responder 132 stores a new certificate chain in the second slot 132_2 of the certificate storage 131 and transmits a certificate update signal SLOT #1 CERT CHAIN UPDATE) to the requester 210 in operation S190b. However, the slot in which the new certificate is updated is not limited to the second slot 132_2, but may include, for example, the third slot 132_3 or an n-th slot 132_n, etc. In addition, when the customer updates the first layer 120, the updated certificate may be a third certificate.

Figure 12:
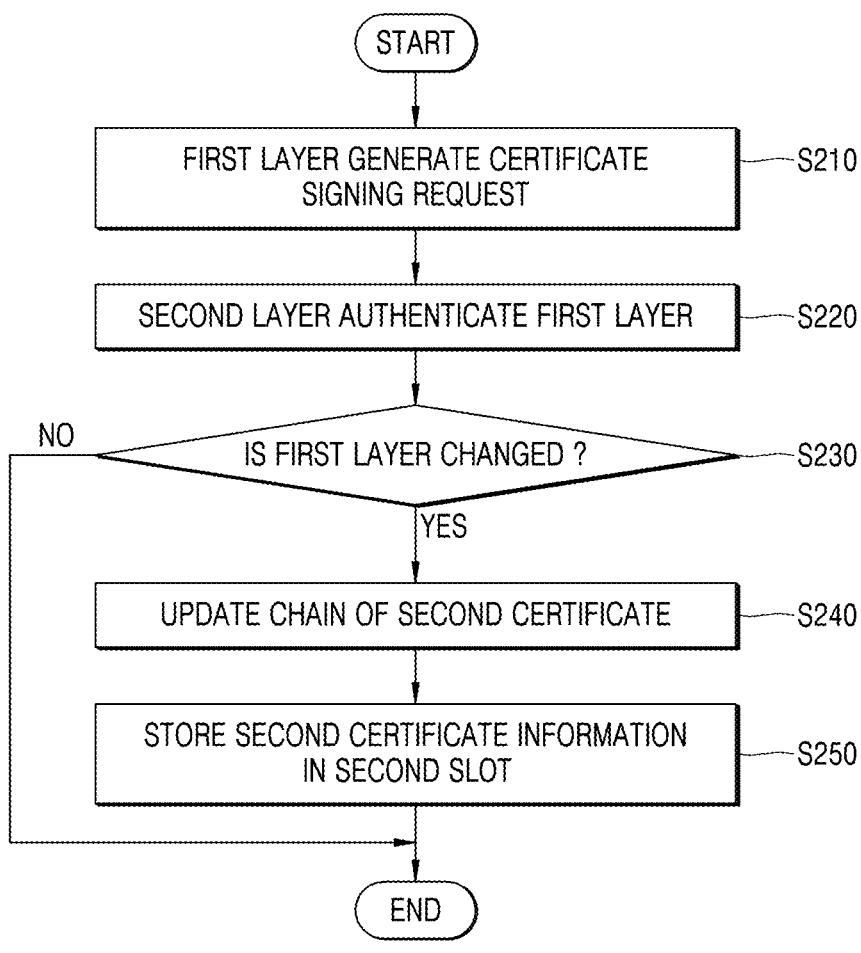
FIG. 12 is a flowchart illustrating a certificate update method according to at least one example embodiment.

FIG. 12 is a flowchart illustrating a certificate update method according to at least one example embodiment.

FIG. 12 is a flowchart a method of updating a certificate based on the device private key DEV_SK according to at least one example embodiment.

Referring to FIG. 12, the CSR may be generated in the first layer 120 in operation S210. Here, the generation of the CSR may include a request for a signature with respect to a device ID. In addition, as described above, the CSR is generated by and/or based on the device CDI determined by the first layer 120, and thus, the CSR may be newly generated when the first layer 120 is changed, modified, updated, etc. In addition, the CSR may include a public key and/or a unique serial number of the device 100, and may be signed by a private key of the device 100, but is not limited thereto.

When the CSR is generated in the first layer 120, the second layer 130 receives the CSR and authenticates the first layer 120 in operation S220. As described below, the authenticating of the first layer 120 may include determining whether the first layer 120 has been changed, and, when it is determined that the first layer 120 has been changed, receiving changed (e.g., updated, modified, etc.) authentication information, and storing information of a second certificate, and/or storing a second certificate including a changed certificate chain, in the second slot 132_2. For example, the second layer 130 may receive the CSR from the first layer 120 and receive a device ID certificate chain corresponding to the CSR. In addition, the second slot 132_2 may store updated device ID certificate chain information.

During the authentication process of the device 100, the host 200 determines whether the first layer 120 has been changed in operation S230. For example, when the first layer 120 is changed, the device 100 may generate the device ID key pair DEV_SK, DEV_PK and the device ID certificate DEVID_Cert, etc. No certificate chain may be formed in the device ID certificate DEVID_Cert according to at least one example embodiment. When there is the device ID certificate DEVID_Cert in which no certificate chain has been formed, the host 200 according to at least one example embodiment may determine that the first layer 120 has been changed, modified, updated, etc.

When the host 200 determines that the first layer 120 has been changed, the second layer 130 updates a chain of the second certificate in operation S240. For example, the responder 132 of the second layer 130 will fail the authentication of the first layer 120 based on the existing certificate in response to the first layer 120 being changed. The host 200 according to at least one example embodiment may transmit the certificate signing request provision signal GET_CSR to the device 100 to authenticate the device 100 when the first layer 120 is changed and the device 100 is rebooted, but is not limited thereto. Here, when the first layer 120 is changed, the host 200 may determine that authentication of the device 100 has failed based on the existing certificate (e.g., stored certificate, original certificate, etc.). When authentication of the device 100 fails, the requester 210 of the host 200 may request new certificate information and update the second certificate including the changed certificate chain information.

The second certificate information including the changed certificate chain may be stored in the second slot 131_2 in operation S250, but is not limited thereto.

Figure 13:
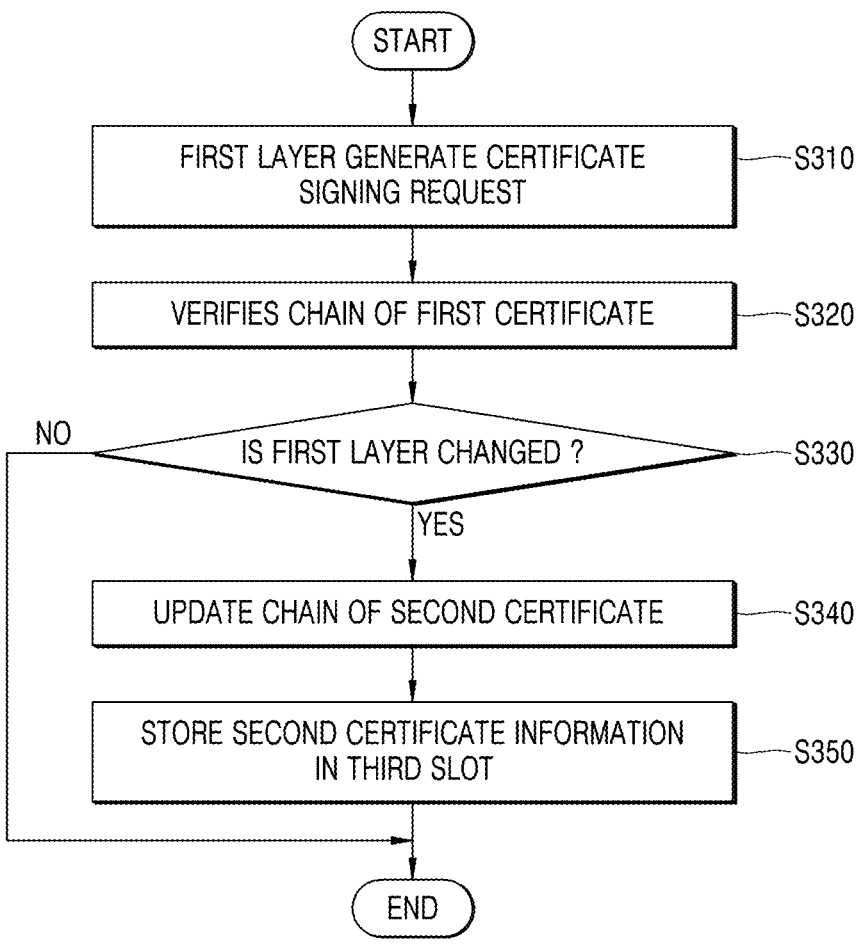
FIGS. 13 and 14 are flowcharts illustrating a certificate update method according to at least one example embodiment.

FIG. 13 is a flowchart illustrating a certificate update method according to at least one example embodiment.

Similar to FIG. 12, in order to perform the certificate update method according to one or more example embodiments of the inventive concepts, the CSR may be generated in the first layer 120 (e.g., bootloader of the device 100) in operation S310. Here, the CSR may include requesting a signature with respect to a device ID. Also, as described above, because the CSR is generated by the device CDI determined by the first layer 120, the certificate signing request CS may be newly generated when the first layer 120 (e.g., bootloader) is changed, updated, modified, etc. In addition, the CSR may include a public key and/or a unique serial number of the device 100, and may be signed by a private key of the device 100, etc.

When the CSR is received, the second layer 130 (e.g., firmware of the device 100, the CA, the SPDM, etc.) receives the CSR and verifies a chain of a first certificate in operation S320. Here, the first certificate may include the device certificate DEV_Cert and the alias certificate Alias_Cert.

When the chain of the first certificate is verified, the host 200 (e.g., host device, etc.) determines whether the first layer 120 has been changed in operation S330.

The host 200 according to at least one example embodiment may transmit the certificate signing request provision signal GET_CSR to the device 100 to authenticate the device 100 when the first layer 120 is changed and the device 100 is rebooted. Here, when the first layer 120 is changed, the host 200 may determine that authentication of the device 100 has failed based on the existing certificate (e.g., the previous certificate, etc.).

When it is determined that the first layer 120 has been changed, the second layer 130 updates a chain of a second certificate in operation S340.

When authentication of the device 100 fails, the host 200 may determine and/or infer that the first layer 120 has been changed, modified, updated, etc. When the first layer 120 is changed (and/or modified, updated, etc.) and the second layer 130 according to at least one example embodiment receives the CSR from the first layer 120, the responder 132 of the second layer 130 may transmit the CSR to the host 200 in response to the certificate signing request provision signal GET_CSR of the requester 210. When the CSR is received, the requester 210 of the host 200 may update the certificate chain based on a manufacturer's certificate stored in the first slot 131_1, but is not limited thereto.

For example, the requester 210 requests the certificate signing request provision signal GET_CSR from the device 100, and the responder 132 transmits the CSR corresponding to the certificate signing request provision signal GET_CSR to the requester 210. When the CSR is received, the requester 210 may request a CA (not shown) to generate an intermediate certificate. When the intermediate certificate is generated, the requester 210 may receive the updated certificate chain and transmit the updated certificate chain to responder 132. According to at least one example embodiment, the requester 210 may perform a certificate key exchange operation KEY_EXCHANGE with the responder 132 using a secure procedure and may transmit the updated certificate chain to the responder 132.

Similar to FIG. 12, when the first layer 120 is changed, the responder 132 of the second layer 130 will fail authentication of the first layer 120 using the and/or based on the existing certificate. Here, the responder 132 may request new certificate information and update the second certificate including the changed certificate chain information. In at least one example embodiment of FIG. 13, the second certificate may include either OEM certificate information and/or customer certificate information.

Here, the second certificate information including the changed certificate chain may be stored in the third slot 131_3 in operation S350.

Figure 14:
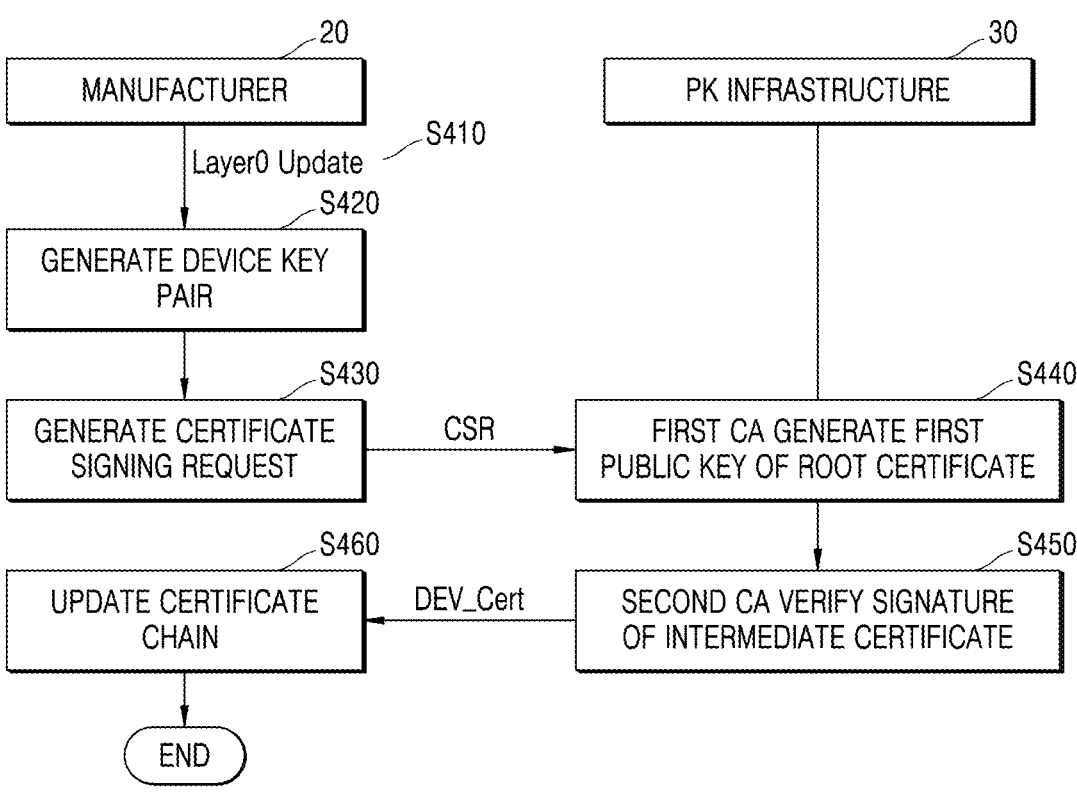

FIG. 14 is a flowchart illustrating a certificate update method according to at least one example embodiment. FIG. 14 illustrates a process of updating a certificate chain in terms of and/or for use in verification of a certificate by a certificate generated by a manufacturer 20 and a public key generated by a PKI 30, etc., but is not limited thereto.

Referring to FIG. 14, when the first layer 120 Layer0 is updated, modified, and/or changed, etc., in operation S410, the first layer 120 manufactured by the manufacturer 20 generates a device key pair in operation S420. Here, the device key pair may form an asymmetric pair and may include a private key and a corresponding public key, but the example embodiments are not limited thereto.

When the device key pair is generated, the first layer 120 may generate the CSR in operation S430. Here, the CSR may include information of device ID certificate DEVID_Cert, but is not limited thereto.

When the CSR is generated, the PKI generates a first public key of a root certificate in operation S440. Here, the root certificate refers to a certificate stored in the host 200, wherein the root certificate may be used in authenticating whether the first layer 120 has been changed, and the public key of the root certificate may be utilized to verify whether a first certificate has been changed. In at least one example embodiment, a CA storing the root certificate may be referred to as a first CA, etc.

When the public key of the root certificate is generated, the PKI 30 verifies a signature of an intermediate certificate in operation S450. The intermediate certificate and the root certificate may be combined through a certificate chain, and may verify whether a device certificate has been changed, modified, updated, etc. In at least one example embodiment, a CA storing the intermediate certificate may be referred to as a second CA, but is not limited thereto.

When the signature of the intermediate certificate is verified by the CA, the manufacturer 20 may update the certificate chain in operation S460. That is, the device certificate update system 10 may update, modify, and/or change the certificate chain by storing the changed device certificate and/or an alias certificate changing, updating, and/or appending the changed device certificate and/or the alias certificate to the certificate chain including the intermediate certificate and/or the root certificate.

Figure 15:
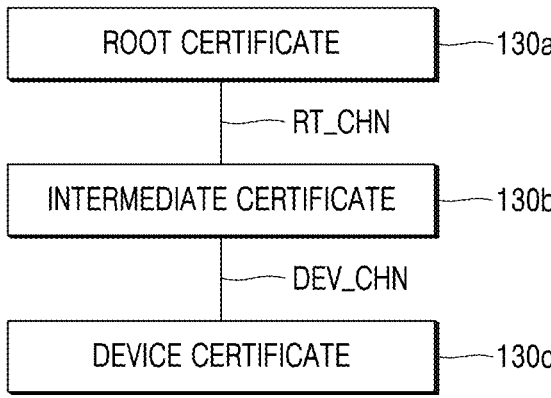
FIG. 15 illustrates a certificate chain according to at least one example embodiment.

FIG. 15 illustrates a certificate chain according to at least one example embodiment.

Referring to FIG. 15, a certificate for verifying whether the first layer 120 of the device 100 is updated may be implemented in and/or based on a certificate chain, and the certificate chain may include one or more of (e.g., a combination of) a root certificate 130a, an intermediate certificate 130b, and/or a device certificate 130c, etc.

For example, the requester 210 may verify a signature of the intermediate certificate 130b based on a first public key of the root certificate 130a stored (e.g., previously stored) in a first slot (e.g., first memory slot). When verification is completed, the root certificate 130a may be connected to the intermediate certificate 130b by a root chain RT_CHN. In addition, when the signature verification of the intermediate certificate 130*b* is successful, a signature of a device ID certificate may be verified based on a second public key included in the intermediate certificate 130*b*. When the signature of the device ID certificate is verified, the device certificate 130*c* may be combined with the intermediate certificate 130*b* by a device chain DEV_CHN.

Figure 16:
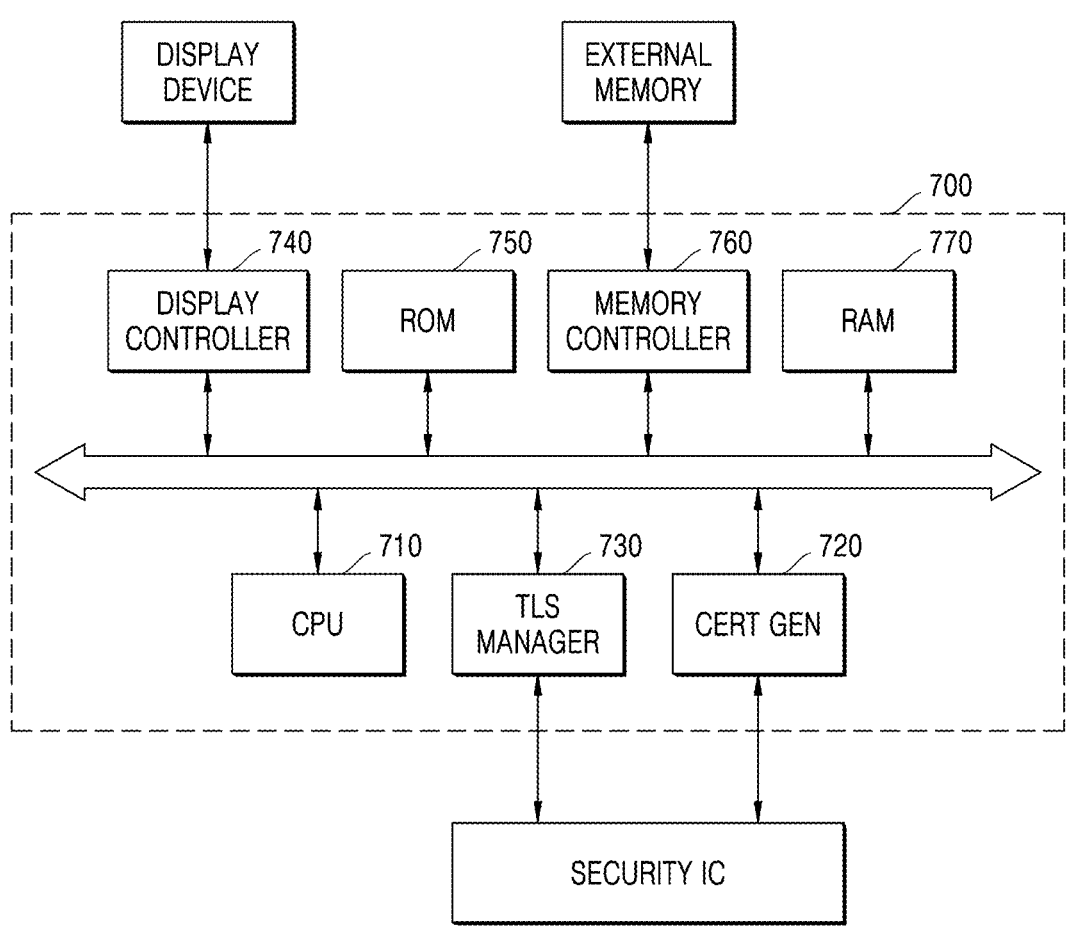
FIG. 16 is a block diagram of an example of an application device according to at least one example embodiment.

FIG. 16 is a block diagram of an example of an application device according to at least one example embodiment.

Referring to FIG. 16, an application processor 700 may be implemented as processing circuitry, such as a system-on-chip (SoC), etc., and the application processor 700 may be mounted on the device described in one or more of the example embodiments to control the overall operation of the device, but the example embodiments are not limited thereto. For example, the application processor 700 may include a central processing unit (CPU) 710, a security processor 720, a requester 730 (e.g., host, host circuitry, host device, etc.), a display controller 740, read-only memory (ROM) 750, a memory controller 760, and/or random-access memory (RAM) 770, etc., but is not limited thereto, and for example, may include a greater or lesser number of constituent components. The application processor 700 may further include other components, for example, a power management unit, a graphics processing unit (GPU), a clock unit, etc., in addition to the components illustrated, or may omit one or more components, etc.

The CPU 710 may process and/or execute programs and/or data stored in the ROM 750 and/or the RAM 770, etc. For example, the CPU 710 may process and/or execute the programs and/or data according to at least one operation clock (e.g., clock signal, etc.). The CPU 710 may be implemented as a multi-core processor, but is not limited thereto. The multi-core processor is one computing component having two or more independent processors (e.g., cores), and each of the processors may read and execute program instructions.

The ROM 750 may non-volatilely store programs and/or data. The ROM 750 may be implemented as erasable programmable read-only memory (EPROM) and/or electrically erasable programmable read-only memory (EEPROM). Also, the RAM 770 may temporarily store programs, data, and/or instructions. For example, programs and/or data stored in the ROM 750 may be temporarily stored in the RAM 770 under control by the CPU 710. The RAM 770 may be implemented as a memory, such as dynamic RAM (DRAM), static RAM (SRAM), etc.

The memory controller 760 performs a function of interfacing with an external memory device, and controls the external memory device according to and/or based on at least one data access request to write and/or read data, etc. Also, the display controller 740 may control a display operation of at least one screen by driving at least one display device, etc.

According to at least one example embodiment, the application processor 700 may communicate with at least one security element (and/or security IC, etc.) which may be implemented as an external separate semiconductor chip, but is not limited thereto. When the application processor 700 is initially driven (e.g., initially operated, booted-up, etc.), a mutual authentication process may be performed with respect to the application processor 700 and the security element according to one or more example embodiments discussed above. According to at least one example embodiment, as the mutual authentication succeeds, the application processor 700 and the security element may perform encrypted communication using a symmetric key, etc.

Also, according to one or more example embodiments described above, the security processor 720, which implements the device 100, and/or the requester 730, which implements the host 200, included in the application processor 700 may perform various operations for public key-based communication, etc. For example, the application processor 700 may provide a request to the security element so that at least one function of a plurality of functions related to public key-based communication are performed in the security element, but is not limited thereto. According to one or more example embodiments above, one or more operations that include, desire, and/or require relevant information not to be exposed to the outside, important information, and/or confidential information, etc., such as an electronic signature for a certificate, a device private key, or the like, may be performed in the security element.

While various example embodiments of the inventive concepts have been particularly shown and described above, it will be understood that various changes in form and details may be made therein without departing from the spirit and scope of the following claims.

What is claimed is:

1. A method of updating a certificate of a device in response to a bootloader of the device being changed, the method comprising:

generating a device identifier comprising unique information of the device;

generating a device identity (ID) certificate signing request (CSR) based on the device identifier;

updating the bootloader, the updating including updating a certificate of the device based on the device ID CSR using firmware of the device in response to a request of a host device; and in response to the bootloader being changed, authenticating the updating of the bootloader based on a first certificate generated by a manufacturer of the device, and changing the device identifier and the device ID CSR, and in response to the authenticating of the updating of the bootloader failing using the first certificate, authenticating the updating of the bootloader based on a second certificate generated by an original equipment manufacturer (OEM) of the device, wherein the second certificate is the updated certificate of the device generated based on the device ID CSR.

2. The method of claim 1, wherein the updating the certificate of the device further includes:

receiving a signing request from the bootloader;

generating a device ID certificate chain in response to the signing request; and updating information of the device ID certificate chain.

3. The method of claim 1, wherein the updating the certificate of the device further includes:

verifying a signature of an intermediate certificate based on a first public key of a stored root certificate; and verifying a signature of a device ID based on a second public key included in the intermediate certificate in response to the verifying of the signature of the intermediate certificate being successful.

4. The method of claim 3, wherein the updating the certificate of the device further includes:

receiving, by the host device, a challenge message to the firmware; and transmitting a challenge authentication message generated based on a device private key to the host device in response to the challenge message.

5. The method of claim 2, wherein the receiving of the signing request of the device ID includes generating a device ID CSR based on the generated device identifier.

6. The method of claim 2, wherein the generating of the device ID certificate chain further includes:

transmitting the device ID CSR to the host device; and receiving, by a certification authority (CA), chain information of the second certificate in response to the device ID CSR.

7. The method of claim 2, wherein the updating of the information of the device ID certificate chain further includes:

changing the certificate of the device based on chain information of the second certificate; and storing the first certificate and the second certificate in a certificate storage device.

8. The method of claim 1, further comprising:

updating a third certificate generated by a customer.

9. The method of claim 8, wherein the updating of the third certificate further includes:

receiving the device ID CSR from the bootloader;

generating a certificate chain in response to the device ID CSR; and updating information of the certificate chain to the first certificate.

10. A method of updating a certificate of a device in response to a bootloader of the device being changed, the method comprising:

generating a device identifier;

generating, by the bootloader, a device identity (ID) certificate signing request (CSR) based on the device identifier; and authenticating an update of the bootloader in response to the device ID CSR, the authenticating of the update of the bootloader further including, verifying a first certificate stored in a first slot of memory, the first certificate generated by a manufacturer of the device, requesting a second certificate from a host device in response to the verifying of the first certificate failing, the second certificate generated based on the device ID CSR by an original equipment manufacturer (OEM) of the device; and storing the second certificate in a second slot of the memory and authenticating the update of the bootloader based on the second certificate and the device ID CSR, wherein in response to the bootloader being changed, the device identifier and the device ID CSR are changed.

11. The method of claim 10, wherein the authenticating of the updating of the bootloader further includes:

receiving the device ID CSR from the bootloader;

generating a certificate chain in response to the device ID CSR; and updating information of the certificate chain stored in the second slot of the memory.

12. The method of claim 11, wherein the authenticating of the updating of the bootloader further includes:

authenticating the updating of the bootloader based on the second certificate that is an alias key certificate.

13. The method of claim 11, wherein the authenticating of the updating of the bootloader further includes:

verifying a signature of an intermediate certificate based on a first public key of a stored root certificate; and verifying a signature of a device ID based on a second public key included in the intermediate certificate in response to the verifying of the signature of the intermediate certificate being successful.

14. The method of claim 11, wherein the authenticating of the updating of the bootloader further includes:

receiving a challenge message from the host device; and transmitting a challenge authentication message generated based on a device private key to the host device in response to the challenge message.

15. The method of claim 11, wherein the authenticating of the updating of the bootloader further includes:

generating the device ID CSR based on the generated device identifier.

16. The method of claim 11, further comprising:

storing information of a third certificate in a third slot of the memory, the storing including, transmitting the device ID CSR to the host device;

receiving, from a certification authority (CA) of the OEM, certificate chain information of the third certificate; and changing an ID certificate of the device based on the chain information of the third certificate.

17. A certificate update system of a device for updating a certificate in response to a bootloader of the device being changed, the certificate update system comprising:

processing circuitry configured to, generate a device identifier comprising unique information of a device;

generate a device identity (ID) certificate signing request (CSR) based on the device identifier using a bootloader;

update the bootloader based on the device ID CSR;

update a certificate of the device in response to a request from a host device; and in response to the bootloader being changed, authenticate an update of the bootloader based on a first certificate generated by a manufacturer of the device, and the device identifier and the device ID CSR are changed, and in response to the authenticating of the updating of the bootloader failing using the first certificate, authenticating the updating of the bootloader based on a second certificate generated by an original equipment manufacturer (OEM) of the device, wherein the second certificate is the updated certificate of the device generated based on the device ID CSR.

18. The certificate update system of claim 17, wherein the processing circuitry is further configured to:

receive the device ID CSR;

generate a device ID certificate chain in response to the device ID CSR; and update information of the device ID certificate chain.

19. The certificate update system of claim 17, wherein the host device is configured to:

verify the device, the verifying including, verifying a signature of an intermediate certificate based on a first public key of a stored root certificate, and verifying a signature of a device ID based on a second public key included in the intermediate certificate in response to succeeding in verifying the signature of the intermediate certificate.

20. The certificate update system of claim 17, wherein the processing circuitry is further configured to:

generate the device ID CSR based on the generated device identifier using the bootloader.

* * * * *